US012210835B2

(12) United States Patent
Xiong et al.

(10) Patent No.: US 12,210,835 B2
(45) Date of Patent: Jan. 28, 2025

(54) MULTI-GRANULARITY ALIGNMENT FOR VISUAL QUESTION ANSWERING

(71) Applicant: Samsung Electronics Co., Ltd., Suwon-si (KR)

(72) Inventors: Peixi Xiong, Evanston, IL (US); Yilin Shen, Santa Clara, CA (US); Hongxia Jin, San Jose, CA (US)

(73) Assignee: Samsung Electronics Co., Ltd., Suwon-si (JP)

( * ) Notice: Subject to any disclaimer, the term of this patent is extended or adjusted under 35 U.S.C. 154(b) by 273 days.

(21) Appl. No.: 17/946,400

(22) Filed: Sep. 16, 2022

(65) Prior Publication Data

US 2023/0106716 A1 Apr. 6, 2023

Related U.S. Application Data

(60) Provisional application No. 63/252,515, filed on Oct. 5, 2021.

(51) Int. Cl.
  *G06F 40/30* (2020.01)
  *G06F 40/284* (2020.01)
  (Continued)

(52) U.S. Cl.
  CPC .......... *G06F 40/30* (2020.01); *G06F 40/284* (2020.01); *G06F 40/289* (2020.01); *G06V 10/40* (2022.01);
  (Continued)

(58) Field of Classification Search
  None
  See application file for complete search history.

(56) References Cited

U.S. PATENT DOCUMENTS 9,965,705 B2 * 5/2018 Chen ..................... G06N 3/02
10,909,401 B2 * 2/2021 Burachas ............... G06T 7/11
(Continued)

FOREIGN PATENT DOCUMENTS

CN 109002852 A * 12/2018 .......... G06K 9/6268
CN 112163608 A 1/2021
(Continued)

OTHER PUBLICATIONS

Teney et al., "Graph-Structured Representations for Visual Question Answering", 2017 IEEE Conference on Computer Vision and Pattern Recognition, pp. 3233-3241 (Year: 2017).*

(Continued)

*Primary Examiner* — Richard Z Zhu

(57) ABSTRACT

In one embodiment, a method includes accessing an image and a natural-language question regarding the image and extracting, from the image, a first set of image features at a first level of granularity and a second set of image features at a second level of granularity. The method further includes extracting, from the question, a first set of text features at the first level of granularity and a second set of text features at the second level of granularity; generating a first output representing an alignment between the first set of image features and the first set of text features; generating a second output representing an alignment between the second set of image features and the second set of text features; and determining an answer to the question based on the first output and the second output.

20 Claims, 5 Drawing Sheets

(51) Int. Cl.

| | | |
|---|---|---|
| *G06F 40/289* | (2020.01) | |
| *G06V 10/40* | (2022.01) | |
| *G06V 10/70* | (2022.01) | |
| *G06V 10/80* | (2022.01) | |
| G06F 16/33 | (2019.01) | |
| G06V 10/426 | (2022.01) | |
| G06V 10/762 | (2022.01) | |
| G06V 10/764 | (2022.01) | |
| G06V 10/82 | (2022.01) | |

(52) U.S. Cl.
CPC ........ *G06V 10/811* (2022.01); *G06F 16/3344* (2019.01); *G06V 10/426* (2022.01); *G06V 10/7635* (2022.01); *G06V 10/764* (2022.01); *G06V 10/82* (2022.01)

(56) References Cited

U.S. PATENT DOCUMENTS

| | | | | |
|---|---|---|---|---|
| 10,949,718 | B2* | 3/2021 | Costabello | G06V 30/19173 |
| 11,670,023 | B2* | 6/2023 | Xu | G10L 15/16 |
| | | | | 382/156 |
| 11,809,822 | B2* | 11/2023 | Lin | G06F 40/216 |
| 12,045,288 | B1* | 7/2024 | Barut | G06F 16/90332 |
| 12,127,726 | B2* | 10/2024 | Wang | A47L 9/2852 |
| 2021/0232773 | A1* | 7/2021 | Wang | G06F 18/21 |
| 2021/0248375 | A1* | 8/2021 | Geng | G06F 16/9035 |
| 2021/0406468 | A1* | 12/2021 | Qin | G06V 10/454 |
| 2021/0406592 | A1* | 12/2021 | Li | G06F 16/532 |
| 2021/0406619 | A1* | 12/2021 | Lv | G06N 3/045 |
| 2022/0327809 | A1* | 10/2022 | Li | G06F 40/284 |
| 2023/0082605 | A1* | 3/2023 | Chen | G06F 16/3347 |
| | | | | 704/9 |
| 2023/0351115 | A1* | 11/2023 | Zeng | G06V 30/413 |

FOREIGN PATENT DOCUMENTS

| | | |
|---|---|---|
| CN | 114020891 A | 2/2022 |
| CN | 114117101 A | 3/2022 |
| CN | 113688296 B | 5/2022 |

OTHER PUBLICATIONS

Guo et al., "Bilinear Graph Networks for Visual Question Answering", arXiv: 1907.09815 (Year: 2020).*

Peng et la., "Cra-net: composed relation attention network for visual question answering" Proceedings of the 27th ACM International Conference on Multimedia, Oct. 2019, pp. 1202-1210. (Year: 2019).*

English translation of CN109002852A. (Year: 2018).*

* cited by examiner

MULTI-GRANULARITY ALIGNMENT FOR VISUAL QUESTION ANSWERING

PRIORITY CLAIM

This application claims the benefit under 35 U.S.C. 119 of U.S. Provisional Patent Application No. 63/252,515 filed Oct. 5, 2021, the entirety of which is incorporated herein by reference.

TECHNICAL FIELD

This application generally relates to computer-based visual question answering.

BACKGROUND

Visual Question Answering (VQA)'s main task is to answer questions about one or more provided images. VQA requires a computational model to understand both the image and the natural-language question, and further to relate, or align, the features of these two modalities (image and natural-language) so that the questions can be competently answered.

VQA has a broad range of applications, including for example, the early education system, visual chatbots, etc. Aspects of VQA include multi-modality alignment, natural language understanding, image understanding, and multi-modal reasoning.

DESCRIPTION OF EXAMPLE EMBODIMENTS

Learning to answer visual questions can be a challenging task since the multimodal inputs—image content and natural-language content—are very different from each other and vary in content and format. Moreover, in order for a computer model to be able to reason in visual question answering, the model needs to understand the image and the question and then process features from those two modalities accordingly, not simply memorize statistics about question-answer pairs.

Figure 3:
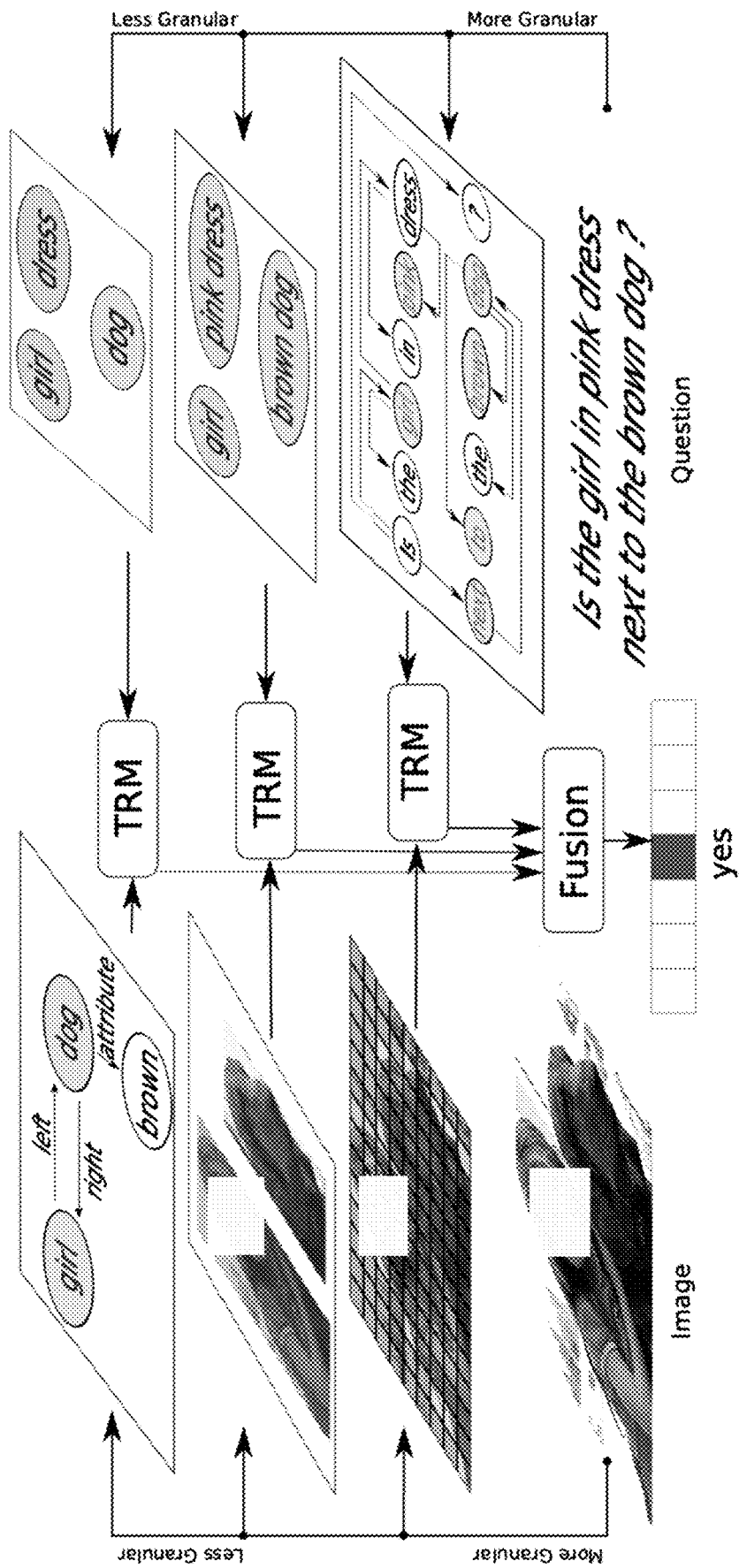
FIG. 3 illustrates another example of multi-granularity alignment for VQA.

For example, FIG. 3 illustrates a relatively simple example of VQA. As shown in the example of FIG. 3, the question is "is the girl in the pink dress next to the brown dog?" and the image is shown on the left of FIG. 3 (while the girl's face is obscured, it will be understood for the purposes of this disclosure that embodiments herein may more commonly operate on unobscured images). Computer-based VQA models cannot directly answer these kinds of image-based questions without further processing the raw visual and language features for a better alignment between the features from those two different modalities.

Embodiments of this disclosure provide improved VQA performance by improving the alignment between image and natural-language input modalities. For example, as shown in FIG. 3 and explained more fully herein, each type of input is divided into separate, distinct levels, or layers, with each level corresponding to different granular detail about the input. Then, embodiments of the VQA model disclosed herein can match features at corresponding levels from the two different types of modalities. This approach learns intra- and inter-modality correlations by multi-granularity alignment, and outputs the final result (e.g., answer to the question) by a decision-fusion module.

In contrast to other approaches, the multi-granularity models disclosed herein split each modality input into different levels of granularity to achieve better correlation between modalities. Moreover, many transformer-based approaches require the models to be pretrained, which requires extra computational resources and extra supervised data. Unlike those models, the models disclosed herein embed graph-structured information, involving lead graphs for extracting multi-modality features to achieve alignment more effectively. In addition, while some models attempt to address the multi-modal problem by the simple concatenation of visual features obtained from a Convolutional Neural Network (CNN) and natural language features obtained from Recurrent Neural Network (RNN) (i.e., via concatenation or a shallow network), and yet other approaches use architectures that imply element-wise summation or multiplication to achieve better fusion of the multimodal features, such fusion methods do not offer good performance. Other approaches further process the features before merging, i.e., embedding these features into a new space or utilizing an attention mechanism to achieve better alignment; however, the direct fusion of whole fine-grained image features and whole natural language sentences results in inferior performance compared to the models disclosed herein. In addition, while some approaches learn attention weights directly on the features of the two modalities, these models are inherently limited when these two modality features are in two domains, as for VQA, because image features are highly diverse, lacking the structure and grammatical rules as language, and natural language features have a higher probability of missing detailed information. To better learn the attention between visual content and text, the models disclosed herein construct input stratification and embed structural information to improve the alignment between different level components.

As explained herein, features of examples embodiments of this disclosure include a multi-granularity alignment architecture that jointly learns intra and inter-modality correlations at three different levels: concept-entity level (an abstract level), region-noun phrase level, and spatial-sentence level (a detailed level). The results are then integrated with a decision fusion module to perform VQA. In addition, in particular embodiments the architecture uses a co-attention mechanism that jointly performs question-guided visual attention and image-guided question attention and improves interpretability.

Figure 1:
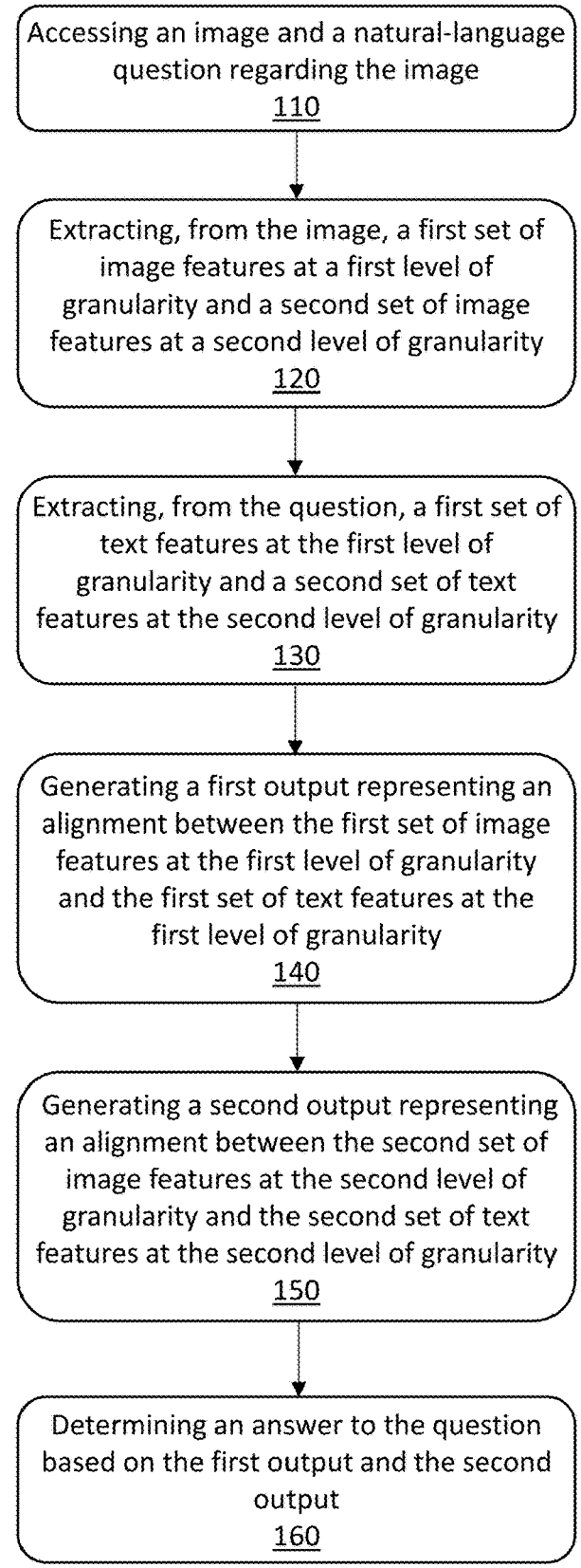
FIG. 1 illustrates an example method of multi-granularity alignment for VQA.
Figure 2:
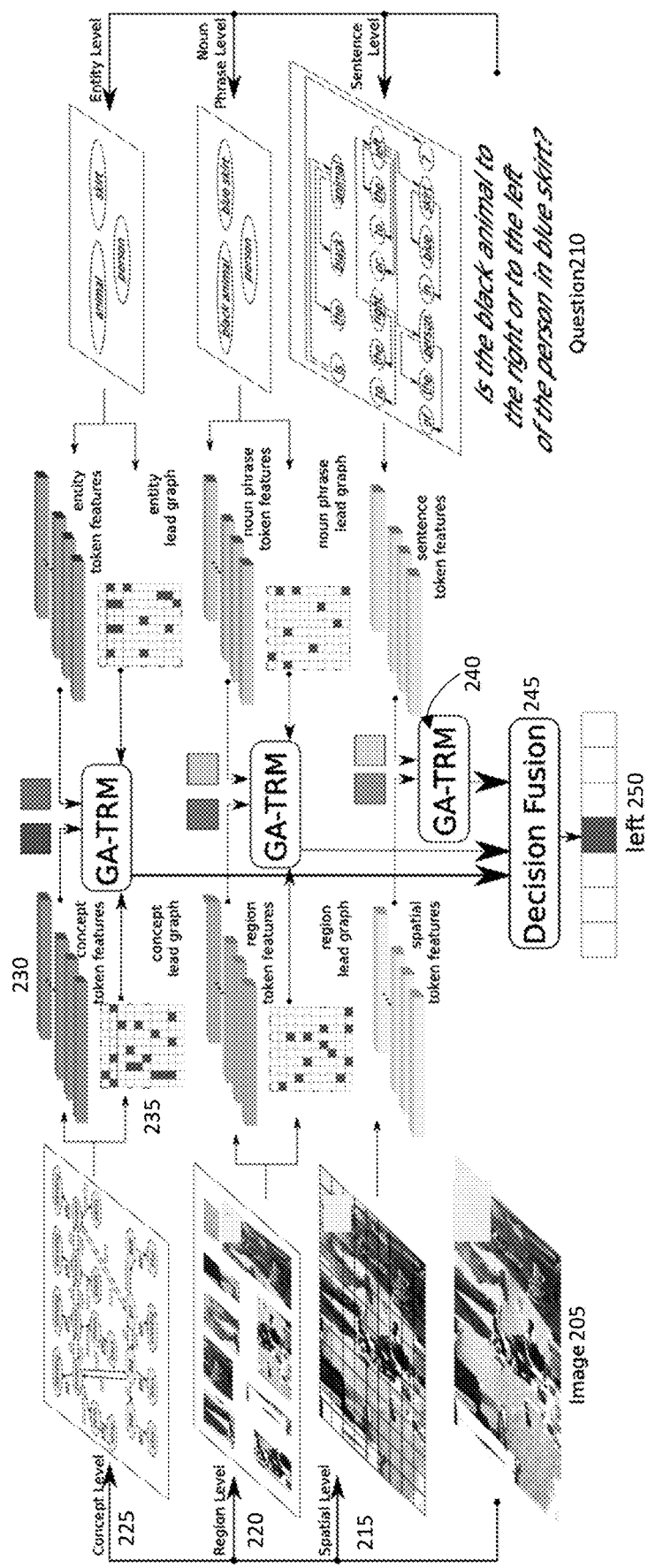
FIG. 2 illustrates an example approach to multi-granularity alignment for VQA.

FIG. 1 illustrates an example method of multi-granularity alignment for VQA. At step 110, the method of FIG. 1 includes accessing an image and a natural-language question regarding the image. For example, FIGS. 2 and 3 illustrate example images and corresponding questions. While the examples of FIGS. 2 and 3 illustrate a single image and single question, this disclosure contemplates that multiple images may be accessed and/or multiple questions may be accessed. For example, a question may be "do any of these images show a girl next to a dog?," and set of images may be accessed to answer that question. This disclosure contemplates that accessing an image and/or accessing a question may, in particular embodiments, include receiving the image or the question, or both, for example by receiving an image from a first client computing device when some or all of the method of FIG. 1 is performed on a server computing device or on a second client computing device. This disclosure also contemplates that some or all of the method of FIG. 1 may be performed on a client computing device on which the image is stored or displayed. This disclosure also contemplates that some or all of the method of FIG. 1 may be performed on a client computing device on which a question is received, e.g., from a user. For example, a user may input a natural-language question, e.g., using an input device such as a keyboard or touchscreen or using an AI assistant, and an image displayed on the device, stored on the device, or accessible from the device may be used to answer the question.

At step 120, the method of FIG. 1 includes extracting, from the image, a first set of image features at a first level of granularity and a second set of image features at a second level of granularity, and at step 130, the method of FIG. 1 includes extracting, from the question, a first set of text features at the first level of granularity and a second set of text features at the second level of granularity. The first and second levels of granularity are at different levels of granularity for representing information in the image and the in the question. For example, FIG. 2 illustrates an example approach to multi-granularity alignment for VQA involving an image 205 and a natural-language question 210. FIG. 2 illustrates three layers of granularity for both image 205 and question 210. As shown in the FIG. 2, a first layer of granularity may be layer 215, a second layer of granularity may be layer 220, and a third layer of granularity may be layer 225. While this disclosure shows three layers of granularity in the example of FIG. 2, this disclosure contemplates using any suitable number of two or more layers of granularity.

The example of FIG. 2 illustrates three layers of granularity and illustrates extracting a set of image features at each layer of granularity. In particular embodiments, objects are detected from the input image 205, for example along with the objects' names, corresponding attributes, and relations between them. On the question side, in the example of FIG. 2, noun phrases, entities, and sentence grammatical structure are detected from the question, for example using natural-language parsing techniques. Then lead graphs (such as lead graph 235) are generated and used to guide alignment learning. As explained more fully herein, lead graphs are constructed from the structural information extracted at each granularity level, where the nodes in the graphs may be regarded as the token features for the next steps. FIG. 2 illustrates an example where a transformer (here, GA-TRM 240) aligns concept-level information from layer 225 with entity-level information from layer 225, aligns region-level information of layer 220 with noun-phrase level information of layer 220, and aligns the spatial-level information of layer 215 with sentence-level information of layer 215. The lead graphs are then used to assist in co-attention learning, and the outputs of the transformers (in this example, the three GA-TRMs) are used to predict an answer to the question. For example, the decision fusion module 245 of the example of FIG. 2 outputs answer 250, "left," in response to question 210. In particular embodiments, the answer may be based on a classification decision, where the answer is determined based on the class member (i.e., potential answer) associated with the highest classification probability. For example, in FIG. 2 each box output from decision fusion module 245 may represent a different class, each corresponding to a particular answer, and answer 250 is the class member associated with the highest classification probability. As explained more fully herein, other approaches, such as natural-language generation, may be used to generate an answer.

As shown in the example of FIG. 2, in the first layer of granularity 215, each image feature in the first set of image features corresponds to one of a plurality of spatial image regions. For example, an image is divided into a set of regions (e.g., a set of individual pixels), and set of spatial features are determined that correspond to each spatial region in the image. For example, the spatial features may be a set of spatial token feature vectors, where each feature vector correspond to one of the spatial regions (e.g., to one pixel) in the image. As shown in the example of FIG. 2, in the first layer of granularity 215, each text feature in the first set of text features corresponds to a word in the natural-language question. For example, each text feature may be a text token feature vector, with each text token feature vector corresponding to one of the words in the natural-language question. As explained more fully herein, at each level of granularity the image may be represented by a graph and the text may be represented by a graph, and each token feature vector may represent a node in the corresponding (image or text) graph.

Similarly, in the example of FIG. 2, in the second layer of granularity 220, each image feature in the second set of image features corresponds to one or more objects in the image. For example, the image may be divided into a set of regions that correspond to identified objects, such as e.g., a person, a dog, legs, etc. As illustrated in the example of FIG. 2, the regions and objects need not be unique, e.g., one object region may include a person, and another object region may include a portion of that person or a piece of clothing worn by the person. A set of image features, such as region token feature vectors, may be extracted, with each region token feature vector corresponding to a particular object/region at the region level. As shown in the example of FIG. 2, in the second layer of granularity 220, each text feature in the second set of text features corresponds to a noun phrase in the natural-language question. For example, each text feature may be a text token feature vector, with each text token feature vector corresponding to one of the noun phrases in the natural-language question.

Continuing with the example of FIG. 2, in the third layer of granularity 225, each image feature in the third set of image features corresponds to a concept from a set of concepts, with each concept providing a semantic representation of at least a portion of the image. For example, the image may be divided into a set of concepts, such as e.g., that the image includes a person, who is standing, and a dog, who is black. As illustrated in the example of FIGS. 2 and 3, the concepts in layer 225 may be represented by a node, with edges connecting the nodes to provide a semantic, conceptual representation of the image. Each node in the image graph of layer 225 may correspond to a particular concept token feature vector. As shown in the example of FIG. 2, in the third layer of granularity 225, each text feature in the third set of text features corresponds to an entity from a set of entities, with each entity corresponding to an object (e.g., a subject, or thing) derived from a noun phrase in the natural-language question. As shown in the example of FIG. 2, the attributes (such as "blue" in the noun phrase "blue skirt") that are present in layer 220 may be removed in layer 225, illustrating how layer 225 is a less granular layer than layer 220.

Below is a description of example procedures used to perform multi-granularity VQA, with reference to the examples of FIGS. 2 and 3 and the example method of FIG. 1.

Given an input image (Img), such as input image 205, three levels of features (in the example of FIGS. 2 and 3) are extracted with different levels of granularity. For each granularity level, there are an associated set of token features (e.g., as represented by the bars in FIG. 2, such as concept token features 230) and lead graphs (such as example lead graph 235). Particular embodiments construct, separately for the image and the question, a graph G={E,L} at each level of granularity representing the current granularity level information, where the tokens (E) are the nodes in the graph, and the lead graph (L) is the connection pairs in the corresponding adjacency matrix. In particular embodiments, at each granularity layer a fully connected graph is constructed for each of the image and the question, and these graphs can then be converted into the image token feature vectors and image lead graph and into the text token feature vectors and text lead graph, respectively, for that layer.

In particular embodiments, such as the example of FIG. 2, a granularity layer may include a concept layer (e.g., layer 225) for an image that includes the semantic features of objects, attributes, and relations between objects. This information is extracted from the image to build a graph $G_c$ (i.e., as shown in the top left section of FIG. 2). To better input $G_c$ to the next stage, particular embodiments first regard relations as extra nodes; then, this graph is split into a node sequence $E_c$ and pairs that represent node connections by index ($L_c$). For example, with reference to the example of FIG. 3, for the top (concept) layer $E_c$=[girl,left,right,dog,brown] and $L_c$=[(0,1),(1,3),(3,2),(2,1),(3,4)], where the directional connections consist of index pairs, describing both the "subject-predicate-object" relation and the "subject/object-attribute" information. Particular embodiments split the "subject-predicate-object" triple into "subject→predicate" and "predicate→object" pair, thereby using index pairs to describe the relationship. In this way, both the "subject-predicate-object" relation and the "subject/object attribute" information are described by the index pairs, which are regarded as the node connections ($L_c$). A token sequence feature $T_c$={$t_{c1},t_{c2},\ldots,t_{cN}$} may be computed from the node sequence $E_c$={$e_{ci}$}$_{i=1}^N$ by, for example, GloVe embedding and the Multi-layer perceptron (MLP).

In particular embodiments, such as the example of FIG. 2, a granularity layer may include a region level (e.g., layer 220) for an image that describes visual features representing a visual region of the object. Unlike the concept features in the concept level, features in this level describe object information in the image visually instead of semantically. The token sequence features $T_r$={$t_{ri}$}$_{i=1}^M$ are extracted by, for example, the Faster R-CNN method, and the relation pairs $L_r$ are similar to $L_c$, where if there is a semantic relation between two objects at the concept level, there is a corresponding relation pair at the region level. For example, for the example of FIG. 3, $E_r$=[$e_{girl},e_{dog}$] and $L_r$=[(0,1),(1,0)].

In particular embodiments, such as the example of FIG. 2, a granularity layer for an image may include a spatial level (e.g., layer 215) that describes the holistic but highest granularity visual features and provides detailed, supplementary information to the previous two levels, i.e., scene information. The token sequence features $T_{sp}$ are extracted from, for example, the backbone CNN, and $L_{sp}$ is equal to the fully connected relations for all feature cells.

Similar to Img, in the examples of FIGS. 2 and 3, three levels of granularity are extracted from an input question (Q), such as question 210 in FIG. 2. As explained below, particular embodiments of this disclosure extract structural and grammatical information, leading to better alignment.

In particular embodiments, such as the example of FIG. 2, a granularity layer for a question may include an entity level (e.g., layer 225) that represents individual objects in the question Q, without attributes. The token features $T_e$ are processed in a similar manner as concept features for Img, and the corresponding lead graph pair $L_e$ corresponds to the fully connected pair in graph G.

In particular embodiments, such as the example of FIG. 2, a granularity layer for a question may include a noun phrase level (e.g., layer 220) that is constructed by filtering the result from a constituency parser for the noun phrase level, for example by discarding the determiners (e.g., 'a', 'the') and filtering out the words expressing positional relations (e.g., 'left', 'right') to save computational resources. Then the phrases are split into word tokens and, in particular embodiments, their GloVe features are processed by the MLP to obtain the token features as $T_{np}$. In addition, the corresponding lead graph pair $L_{np}$ corresponds to the fully connected pair.

In particular embodiments, such as the example of FIG. 2, a granularity layer for a question may include a sentence level (e.g., layer 215). For example, particular embodiments may process the question Q with a dependency parser to get the corresponding adjacency matrix ($D_{eps}$) from the dependency graph. Instead of directly inputting the sentence token into the transformer to fuse multimodality features, this example first uses an extra transformer module to process the sentence to get the context-aware features $T_s$, as explained below, where the token features are $T_s$=Trm(MLP (GloVe(Q)), Deps), where GloVe(•) is the GloVe word embedding, MLP(•) is the Multi-layer perceptron, and Trm (t, g) is the transformer module with input tokens t and lead graph pair g. Since the connection information is already embedded in $T_s$, the lead graph pair for sentence-level ($L_s$) consists of the fully connected pair.

At step 140 the method of FIG. 1 includes generating a first output representing an alignment between the first set of image features at the first level of granularity and the first set of text features at the first level of granularity, and at step 150 the method of FIG. 1 includes generating a second output representing an alignment between the second set of image features at the second level of granularity and the second set of text features at the second level of granularity. For example, as shown in FIG. 2, the token features and lead graph at each level, for each of the image and the question, may be input to a transformer, such as a GA-TRM 240 shown in the example of FIG. 2 and described more fully herein.

Figure 4:
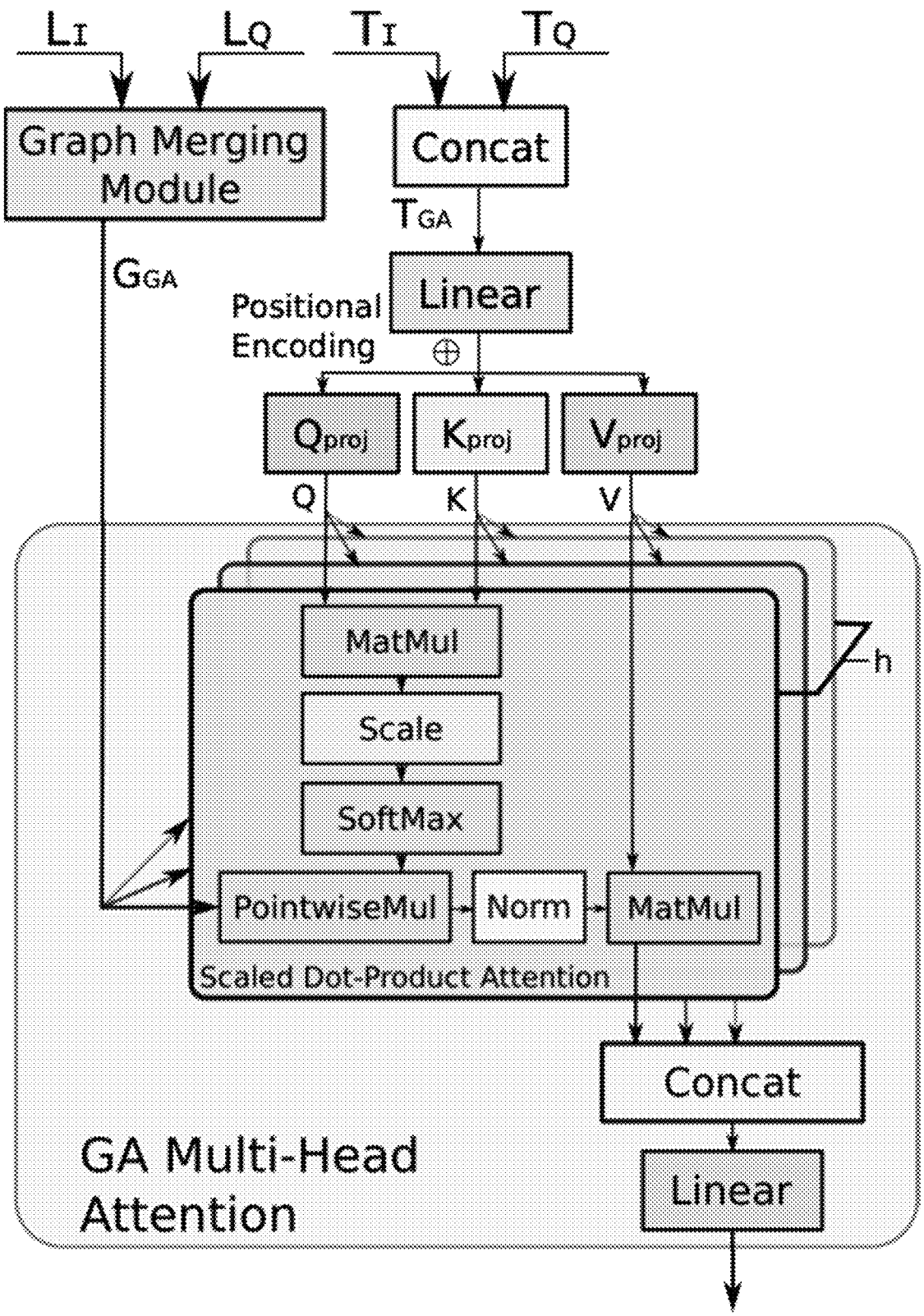
FIG. 4 illustrates an example granularity-alignment transformer.

FIG. 4 illustrates an example granularity-alignment transformer design for using token features and lead graphs for alignment learning. As used herein, the architecture shown in FIG. 4 may be referred to as a GA-TRM (granularity alignment transformer). Among other things, FIG. 4 illustrates a unique attention layer for a transformer used to perform multi-granularity alignment.

Referring again to the examples of FIGS. 2 and 3, the third granularity level, i.e., the concept and entity token features from the input image and question, respectively, are used as the token inputs of the GA-TRM, which obtains the most abstract information of both modalities. For the second granularity level, the object region and noun phrase token features from the input image and question, respectively, are fed into the GA-TRM to learn the co-attention. For the first granularity level, the spatial token features from the image and the sentence token features from the question are aligned by the GA-TRM, providing the model with the most detailed information from the two modalities.

A transformer architecture can use stacked self-attention and pointwise, fully connected layers for both the encoder and decoder. The attention function can be described as mapping a query and a set of key-value pairs to an output. Embodiments of this disclosure use this architecture, as shown in detail in FIG. 4. The token features from the image ($T_I \in \{T_c, T_r, T_{sp}\}$) and question ($T_Q \in \{T_e, T_{np}, T_s\}$)) modalities are concatenated. After linear projection, learnable positional encoding is used to include both relative and absolute position information. For each token, a query vector (Q), a key vector (K), and a value vector (V) are created, by multiplying the embeddings of the three matrices that are trained during the training process. Instead of utilizing a single attention module, embodiments also linearly project Q, K, and V h times with different, learned linear projections. Each of the sets of vectors is then input into the scaled dot-product attention, and pointwise multiplied with the lead graph ($G_{GA}$) from the graph-merging module (explained more fully below):

$$Att_{GA}(Q, K, V) = norm\left(softmax\left(\frac{QK^T}{\sqrt{d_k}}\right) \circ G_{GA}\right) V,$$

where $d_k$ represents the dimensionality of the input, and norm(•) is the normalization over rows. Then, the resulting sets of vectors are concatenated and once again projected, resulting in the final values output from the model architecture.

A graph-merging module, such as is illustrated in FIG. 4, may operate as follows. The lead graphs from the image ($G_I$) and the question ($G_Q$) are binary graphs that are first constructed from the corresponding graph pairs $L_I$ and $L_Q$. Here, $L_I$ and $L_Q$ are chosen from the lead graph pairs from images ($L_c$, $L_r$, $L_{sp}$) and questions ($L_e$, $L_{np}$, $L_s$), respectively. The dimensions of $G_I$ are $\|T_I\| \times \|T_I\|$ while the dimensions of GQ are $\|T_Q\| \times \|T_Q\|$. For each pair in $L_I$ and $L_Q$, the model assigns the corresponding cell in the binary graph a value of 1, while the other cells are assigned a value of 0.

For example, suppose that $L_I=[(0,1),(1,3),(3,2),(2,1)]$, $\|T_I\|=4$, and $G_I=[[0,1,0,0],[0,0,0,1],[0,1,0,0],[0,0,1,0]]$. The merged lead graphs are a set of binary graphs of dimension $(\|T_I\|+\|T_Q\|) \times (\|T_I\|+\|T_Q\|)$. The model sets different lead graphs for different layers of encoders.

For example, as explained below an example encoder may be composed of a stack of 3 identical layers, and for the first layer of the encoder the lead graph may be:

$$\begin{bmatrix} 0_{\|T_I\| \times \|T_I\|} & 0_{\|T_I\| \times \|T_Q\|} \\ 0_{\|T_Q\| \times \|T_I\|} & 1_{\|T_Q\| \times \|T_Q\|} \end{bmatrix}.$$

for example in order to make the model learn the self-attention of the question, since the visual features are relatively high-level and require limited context aggregation with respect to words in a sentence, the latter of which needs further processing.

For the second layer of the encoder, the lead graph may be $$\begin{bmatrix} 0_{\|T_I\| \times \|T_I\|} & 1_{\|T_I\| \times \|T_Q\|} \\ 1_{\|T_Q\| \times \|T_I\|} & 0_{\|T_Q\| \times \|T_Q\|} \end{bmatrix}$$

for example to have the model learn the co-attention between the modalities.

For the third layer of the encoder the lead graph may be:

$$\begin{bmatrix} G_I & 1_{\|T_I\| \times \|T_Q\|} \\ 1_{\|T_Q\| \times \|T_I\|} & G_Q \end{bmatrix}$$

which makes the encoder focus on the existing connectivity in the two modalities At step 160, the method of FIG. 1 includes determining an answer to the question based on the first output and the second output. For example, referring to the examples of FIGS. 2 and 3, the outputs of each level alignment are $H_{ce}$, $H_{on}$ and $H_{ss}$, which represent the alignments of the concept-entity, region-noun phrase, and spatial-sentence layers illustrated in those examples. Then, a linear multimodal fusion function may be defined as follows:

$$H_{GA}=W_{GA}{}^T[W_{ce}{}^T\mathcal{L}\text{ayer}\mathcal{N}\text{orm}(H_{ce}); W_{on}{}^T\mathcal{L}\text{ayer}$$
$$\mathcal{N}\text{orm}(H_{on}); W_{ss}{}^T\mathcal{L}\text{ayer}\mathcal{N}\text{orm}(H_{ss})],$$

where [•;•;•] is the concatenation operation on vectors, $W_{ce}$, $W_{on}$, $W_{ss}$, and $W_{GA}$ are linear projection matrices, and LayerNorm(•) is used to stabilize the training. In particular embodiments, and different from the approach used in sequence-to-sequence learning tasks, the model architecture disclosed herein may use the Transformer module to perform classification. For example, the model may individually compute the cross-entropy loss from the outputs from the three alignment layers (i.e., one output for each layer). An early fusion strategy, such as that disclosed in the equation for $H_{GA}$ above, is used to have each alignment output stream learn the attention. The loss may be defined as follows:

$$L=L_{CE}(f_{ce},a)+L_{CE}(f_{on},a)+L_{CE}(f_{ss},a)++L_{CE}(f_{GA},a),$$

where $f_{ee}$, $f_{on}$, $f_{ss}$, and $f_{GA}$ represent the logits for the above three streams and their fusion, respectively, and a is the answer to the question. This loss function may represent a "late fusion" approach where classification is performed on each input to calculate a loss corresponding to that input, and then the losses are added together to arrive at an overall loss value. As described above, this late fusion approach may be used with the early fusion approach described above to arrive at an answer according to a classification approach.

As an example implementation for multi-granularity VQA, an encoder and decoder may be separately composed of a stack of 3 identical layers. For the multi-head attention, 8 heads may be used to achieve co-attention learning. The model is trained with distributed training, for example using 4 GPUs. The learning rate is set to $10^{-4}$ with Adam optimizer, and batch size is set to 256. Particular embodiments may merge the same relation tokens and attribute tokens in the concept level to reduce computational load and update the lead graph accordingly; without changing object category tokens. A [SEP] (special end-of-sequence) token may be inserted after token features from the image modality and may be included in the corresponding dimension. The visual features are extracted using known extraction techniques, and the scene graph may be built using known techniques. The spatial level features may likewise be obtained using known techniques. The specific numbers and architecture described in this paragraph are only examples; other numbers and architectures may be used when implementing multi-granularity VQA.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device described herein, by a processor coupled to non-transitory computer readable storage media, or any suitable combination thereof.

Figure 5:
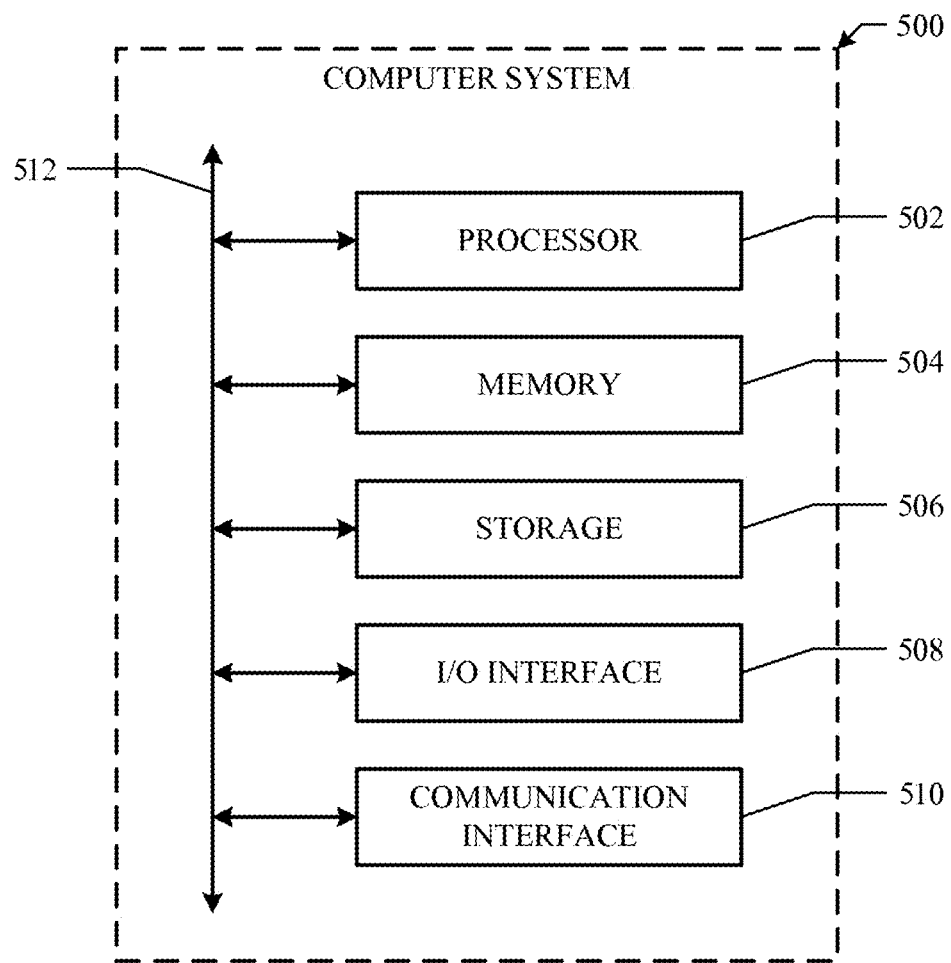
FIG. 5 illustrates an example computing device.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
accessing an image and a natural-language question regarding the image;
extracting, from the image:
a first set of image features at a first, spatial level of granularity comprising a set of first image portions, each first image portion having a first number of pixels; and
a second set of image features at a second, regional level of granularity comprising a set of one or more second image portions, each second image portion containing one or more objects in the image and having a second number of pixels that is greater than the first number of pixels;
extracting, from the question:
a first set of text features at a first level of granularity that separately identifies each word in the natural-language question;
and a second set of text features at a second level of granularity that separately identifies one or more phrases in the natural-language question;
generating a first output representing an alignment between the first set of image features at the first, spatial level of granularity and the first set of text features at the first level of granularity;
generating a second output representing an alignment between the second set of image features at the second, regional level of granularity and the second set of text features at the second level of granularity; and
determining an answer to the question based on the first output and the second output.

2. The method of claim 1, wherein each image feature in the second set of image features corresponds to one or more object regions in the image.

3. The method of claim 2, wherein each text feature in the second set of text features corresponds to a noun phrase in the natural-language question.

4. The method of claim 3, further comprising:
extracting, from the image, a third set of image features at a third level of granularity;
extracting, from the question, a third set of text features at the third level of granularity;
generating a third output representing an alignment between the third set of image features at the third level of granularity and the third set of text features at the third level of granularity; and
determining an answer to the question based on the first output, the second output, and the third output.

5. The method of claim 4, wherein each image feature in the third set of image features corresponds to a concept from a set of concepts, each concept providing a semantic representation of at least a portion of the image.

6. The method of claim 5, wherein each text feature in the third set of text features corresponds to an entity from a set of entities, each entity corresponding to an object derived from a noun phrase in the natural-language question.

7. The method of claim 1, further comprising tokenizing the image features into image token feature vectors and tokenizing the text features into text token feature vectors.

8. The method of claim 7, wherein:
each image token feature vector corresponds to a node in a graph representing the image at the corresponding level of granularity; and
each text token feature vector corresponds to a node in a graph representing the natural-language question at the corresponding level of granularity.

9. The method of claim 8, further comprising:
generating, from the image and at each level of granularity, an image lead graph; and
generating, from the natural-language questions and at each level of granularity, a text lead graph.

10. The method of claim 9, wherein:
generating the first output comprises determining, by a transformer model, the first output based on: the image token feature vector at the first level of granularity, the text token feature vector at the first level of granularity, the image lead graph at the first level of granularity, and the text lead graph at the first level of granularity; and
generating the second output comprises determining, by the transformer model, the second output based on: the image token feature vector at the second level of granularity, the text token feature vector at the second level of granularity, the image lead graph at the second level of granularity, and the text lead graph at the second level of granularity.

11. The method of claim 10, further comprising concatenating, by the transformer model, the image token feature vector and the text token feature vector at each level of granularity.

12. The method of claim 11, further comprising:
merging, by the transformer model, the image lead graph and the text lead graph at each level of granularity; and
modifying, using the merged lead graphs at each level, the concatenated image token feature vector and text token feature vector at that level.

13. The method of claim 12, wherein the transformer model comprises a GA-TRM transformer.

14. The method of claim 1, wherein determining the answer to the question comprises selecting an answer from a set of candidate answers based on a probability associated with each candidate answer.

15. One or more non-transitory computer readable storage media embodying instructions and coupled to one or more processors that are operable to execute the instructions to:
access an image and a natural-language question regarding the image;
extract, from the image:
a first set of image features at a first, spatial level of granularity comprising a set of first image portions, each first image portion having a first number of pixels; and
a second set of image features at a second, regional level of granularity comprising a set of one or more second image portions, each second image portion containing one or more objects in the image and having a second number of pixels that is greater than the first number of pixels;
extract, from the question:
a first set of text features at a first level of granularity that separately identifies each word in the natural-language question;

and a second set of text features at a second level of granularity that separately identifies one or more phrases in the natural-language question;
generate a first output representing an alignment between the first set of image features at the first, spatial level of granularity and the first set of text features at the first level of granularity;
generate a second output representing an alignment between the second set of image features at the second, regional level of granularity and the second set of text features at the second level of granularity; and
determine an answer to the question based on the first output and the second output.

16. The media of claim 15, wherein the one or more processors are further operable to execute the instructions to:
extract, from the image, a third set of image features at a third level of granularity;
extract, from the question, a third set of text features at the third level of granularity;
generate a third output representing an alignment between the third set of image features at the third level of granularity and the third set of text features at the third level of granularity; and
determine an answer to the question based on the first output, the second output, and the third output.

17. A system comprising one or more processors and a non-transitory computer readable storage media embodying instructions coupled to the one or more processors, the one or more processors operable to execute the instructions to:
access an image and a natural-language question regarding the image;
extract, from the image:
a first set of image features at a first, spatial level of granularity comprising a set of first image portions, each first image portion having a first number of pixels; and
a second set of image features at a second, regional level of granularity comprising a set of one or more second image portions, each second image portion containing one or more objects in the image and having a second number of pixels that is greater than the first number of pixels;
extract, from the question;
a first set of text features at a first level of granularity that separately identifies each word in the natural-language question;
and a second set of text features at a second level of granularity that separately identifies one or more phrases in the natural-language question;
generate a first output representing an alignment between the first set of image features at the first, spatial level of granularity and the first set of text features at the first level of granularity;
generate a second output representing an alignment between the second set of image features at the second, regional level of granularity and the second set of text features at the second level of granularity; and
determine an answer to the question based on the first output and the second output.

18. The system of claim 17, wherein the one or more processors are further operable to execute the instructions to:
extract, from the image, a third set of image features at a third level of granularity;
extract, from the question, a third set of text features at the third level of granularity;
generate a third output representing an alignment between the third set of image features at the third level of granularity and the third set of text features at the third level of granularity; and
determine an answer to the question based on the first output, the second output, and the third output.

19. The system of claim 18, wherein each image feature in the third set of image features corresponds to a concept from a set of concepts, each concept providing a semantic representation of at least a portion of the image.

20. The system of claim 17, further comprising one or more processors that are operable to execute the instructions to tokenize the image features into image token feature vectors and tokenizing the text features into text token feature vectors.

* * * * *